United States Patent [19]

Takahashi et al.

[11] Patent Number: 4,754,355
[45] Date of Patent: Jun. 28, 1988

[54] OPTICAL HEAD

[75] Inventors: Akira Takahashi; Toshihisa Deguchi, both of Nara; Yoshiteru Murakami, Nishinomiya; Michinobu Mieda, Tenri; Kazuo Van; Kenji Ohta, both of Nara, all of Japan

[73] Assignee: Sharp Kabushiki Kaisha, Osaka, Japan

[21] Appl. No.: 36,427

[22] Filed: Apr. 9, 1987

[30] Foreign Application Priority Data

Apr. 10, 1986 [JP] Japan .................................. 61-83916

[51] Int. Cl.⁴ .............................................. G11B 5/32
[52] U.S. Cl. ................................................... 360/114
[58] Field of Search ......................... 360/114; 369/13

[56] References Cited

U.S. PATENT DOCUMENTS

| RE 26,952 | 9/1970 | Baaba et al. | 360/114 |
| 3,480,933 | 11/1969 | Treves | 360/114 |
| 3,739,362 | 6/1973 | Eschelbach | 360/114 |

Primary Examiner—John H. Wolff
Attorney, Agent, or Firm—Birch, Stewart, Kolasch, & Birch

[57] ABSTRACT

An optical head for a magneto-optical disk, including a diaphragm for cutting at least an outer portion of a bundle of rays, which is provided in the course of an optical system of a signal detecting portion.

3 Claims, 4 Drawing Sheets

OPTICAL HEAD

BACKGROUND OF THE INVENTION

The present invention relates to an optical head for a magneto-optical disk.

Recently, much attention has been is focused, as an erasable optical memory, on a magneto-optical disk. The substrate of the magneto-optical disk is made of glass or plastics. Especially, in view of productivity and easiness of handling, favorable consideration is given to plastics such as acrylic plastic, polycarbonate plastic, etc. However, these plastics are readily subjected to double refraction especially in the case of polycarbonate plastic in comparison with glass and therefore, have optical characteristics inferior to those of glass. Especially, in a disk made of plastic produced by injection molding, double refraction is likely to take place. Meanwhile, in the magneto-optical disk, signals are reproduced by using linearly polarized light. Thus, if double refraction takes place in the substrate of the magneto-optical disk, linearly polarized light is elliptically polarized, thereby resulting in excessive deterioration of the quality of the reproduced signals.

Namely, when signals are actually read from the magneto-optical disk, laser beams are usually transmitted through the substrate by using a lens having a numerical aperture (NA) of 0.5 to 0.6 so as to be condensed. When double refraction takes place in the substrate, linearly polarized light incident upon the substrate is elliptically polarized while being transmitted through the substrate. The above described double refraction is classified into two kinds, i.e. double refraction in the direction of the plane of the substrate and double refraction in a direction perpendicular to the plane of the substrate. It is to be noted here that the double refraction in the direction perpendicular to the plane of the substrate means that there is a difference between a refractive index in the direction perpendicular to the plane of the substrate and that in the direction of the plane of the substrate. Meanwhile, the double refraction in the the plane of the substrate means that there is a difference between refractive indexes in different directions in the plane of the substrate. The double refraction in the direction of the plane of the substrate equally affects polarized light at any position of a bundle of rays. On the other hand, effects of the double refraction in the direction perpendicular to the plane of the substrate, on polarized light varies according to positions in the bundle of rays. Namely, at the center of the bundle of rays, polarized light is incident upon the substrate in a direction approximately perpendicular to the plane of the substrate and therefore, is affected substantially only by the double refraction in the direction of the plane of the substrate so as to be hardly affected by the double refraction in the direction perpendicular to the plane of the substrate. However, since light at an outer portion of the bundle of rays is obliquely incident upon the substrate and thus, is affected by not only the double refraction in the direction of the plane of the substrate but also by the double refraction in the direction perpendicular to the plane of the substrate.

Meanwhile, in the case where an orientation of polarized light incident upon the substrate is parallel to or perpendicular to the plane of incidence, linearly polarized light is maintained as it is. A substrate produced by injection molding of polycarbonate plastic has a double refraction in the direction of the plane of the substrate on the order of $10^{-6}$ but has a double refraction in the direction perpendicular to the plane of the substrate on the order of $10^{-4}$ greater by two figures than the double refraction in the direction of the plane of the substrate. Hence, it follows that the change of linearly polarized light to elliptically polarized light is mainly caused by the double refraction in the direction perpendicular to the plane of the substrate.

It is supposed here that a Z-axis is directed in a direction perpendicular to the principal plane of the substrate and an X-axis, a Y-axis and the Z-axis have refractive indexes nx, ny and nz, respectively. Furthermore, assuming that character $\alpha$ denotes an angle formed between the plane of incidence of laser beams and the X-axis and character $\theta$ denotes an angle of refraction on the substrate, a refractive index ns in the direction perpendicular to the plane of incidence is approximately expressed by the following equation:

$$ns \simeq 1/\sqrt{\sin^2\alpha/(nx)^2 + \cos^2\alpha/(ny)^2}$$

where: $|nx-ny| \leq |(nx+ny)/2 - nz|$.

Meanwhile, a refractive index np in the direction of the plane of incidence is given by the following equation:

$$np \simeq 1/\sqrt{\cos^2\theta(\cos^2\alpha/(nx)^2 + \sin^2\alpha/(ny)^2) + \sin^2\theta(nz)^2}.$$

FIG. 1 shows how reflected light undergoes polarization at respective positions of a bundle of rays when linearly (polarized light polarized in the direction of the X-axis) is incident upon a prior art magneto-optical disk. FIG. 1A is a side elevational view showing a portion in the vicinity of the prior art magneto-optical disk and includes a condenser lens 1, a plastic substrate 2, a recording medium 3 and a light beam 4. FIG. 1B is a top plan view of FIG. 1A showing polarization of reflected light at respective positions of the bundle of rays. The linearly polarized light is maintained as it is on the X-axis and the Y-axis but gradually changes elliptically as the position of the bundle of rays is further outwardly displaced in directions forming an angle of 45 degrees with the X-axis and the Y-axis, thereby resulting in deterioration of the quality of the reproduced signals.

SUMMARY OF THE INVENTION

Accordingly, an essential object of the present invention is to provide an optical head in which reproduced signals of sufficiently high quality can be obtained even in the case where a plastic substrate is employed, with substantial elimination of the disadvantages inherent in conventional optical heads of this kind.

In order to accomplish this object of the present invention, an optical head for a magneto-optical disk embodying the present invention comprises a diaphragm for cutting at least an outer portion of a bundle of rays, which is provided in the course of an optical system of a signal detecting portion.

Further scope of applicability of the present invention will becom apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become apparent from the following description taken in conjunction with the preferred embodiment thereof with reference to the accompanying drawings which are given by way of illustration only, and thus are not limitative of the present invention, and in which.

DETAILED DESCRIPTION OF THE INVENTION

Figure 1A:
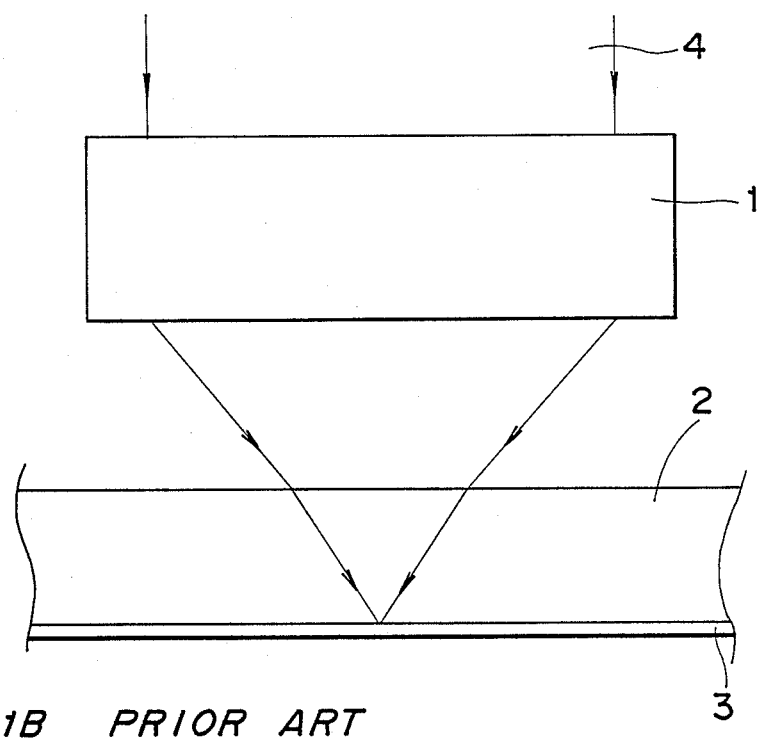
FIG. 1A is a side elevational view of a prior art magneto-optical disk (already referred to)
Figure 1B:
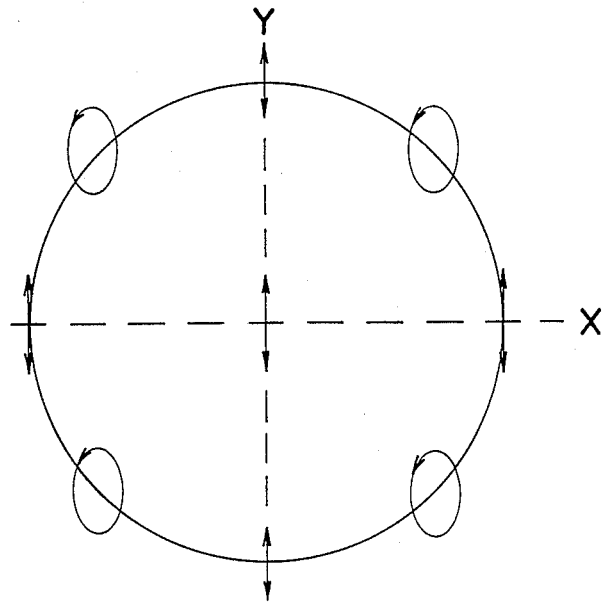
FIG. 1B is a top plan view of FIG. 1A (already referred to)

Before the description of the present invention proceeds, it is to be noted that like parts are designated by like reference numerals throughout the views of the accompanying drawings.

Figure 2:
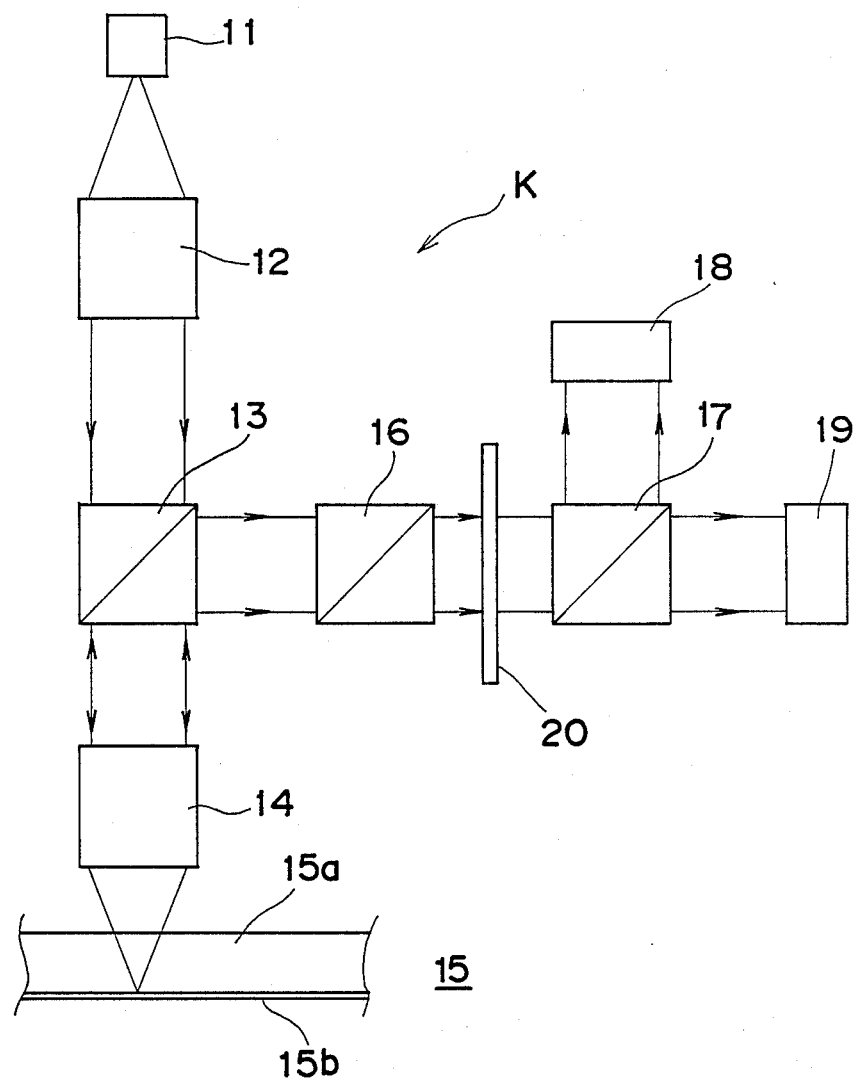
FIG. 2 is a view showing an arrangement of a reproducing optical system of an optical head according to one preferred embodiment of the present invention.

Referring now to the drawings and with particular reference to FIG. 2, an optical head K according to one preferred embodiment of the present invention is shown. The optical head K includes a laser diode 11, a condenser lens 12, a half mirror 13, a condenser lens 14, a disk 15, a half mirror 16, an analyzer 17 having an axis of polarization set at an angle of 45 degrees and photodetectors 18 and 19. The disk 15 includes a polycarbonate substrate 15a and a recording medium 15b. A bundle of rays introduced by the half mirror 16 is used for a servomechanism of the optical head K. Outputs of the photodetectors 18 and 19 act as reproduced signals.

The optical head K further includes a light cutting diaphragm 20 for cutting elliptically polarized light referred to earlier. The light cutting diaphragm 20 is made of opaque material such as metals, paper, plastics or the like and is interposed between the half mirror 16 and the analyzer 17.

Figure 3A:
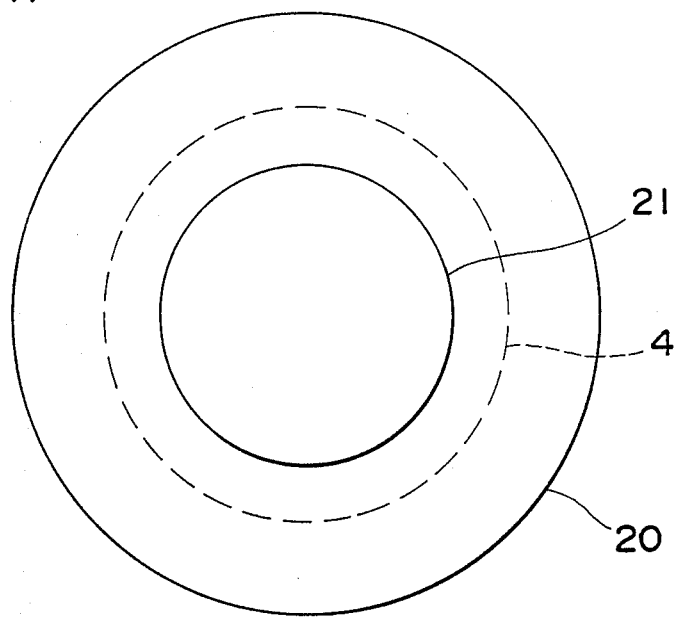
FIGS. 3A and 3B are top plan views showing examples of a light cutting diaphragm employed in the optical head of FIG. 2, respectively.
Figure 3B:
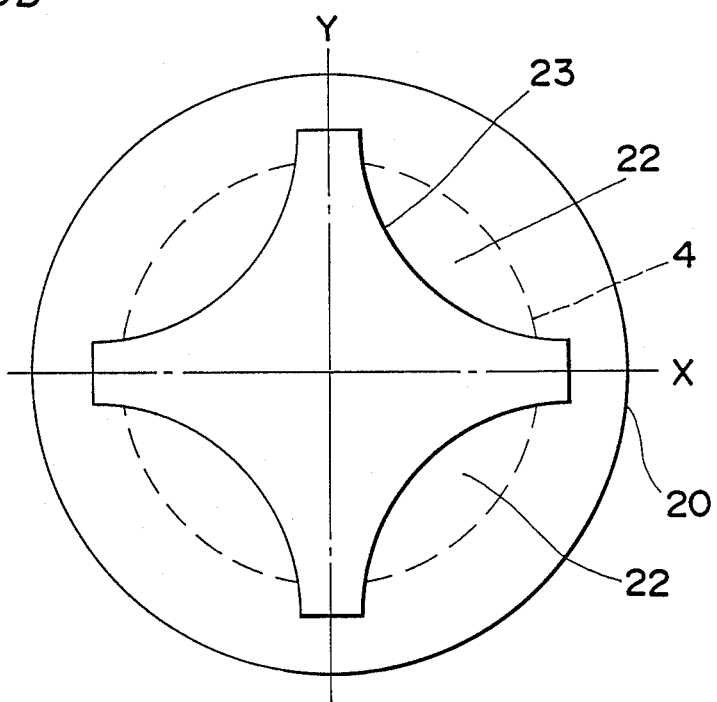

FIGS. 3A and 3B show examples of the light cutting diaphragm 20. In FIG. 3A, the light cutting diaphragm 20 is formed with a circular through-hole 21. The through-hole 21 has a diameter smaller than an outside diameter (shown by dotted lines) of a light beam 4 so as to cut an outer portion of the bundle of rays, which outer portion changes elliptically. In FIG. 3B, the light cutting diaphragm 20 is formed with a substantially cross-shaped through-opening 23 defined by four arcuate light cutting portions 22 for cutting four outer portions of the bundle of rays, respectively, which arcuate light cutting portions are diagonally opposed so as to form an angle of 45 degrees with the X-axis and the Y-axis.

Generally, if reflected light from a disk is elliptically polarized, the modulation degree of signals drops, so that noises in the signals increase, thereby resulting in drop of a signal-to-noise ratio (S/N).

Figure 4A:
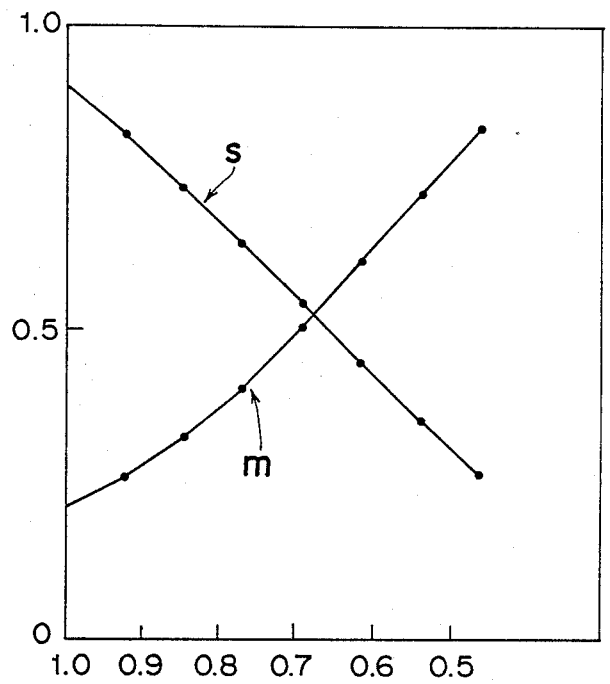
FIGS. 4A and 4B are graphs indicative of improvement of modulation degree by the use of the light cutting diaphragms of FIGS. 3A and 3B, respectively.
Figure 4B:
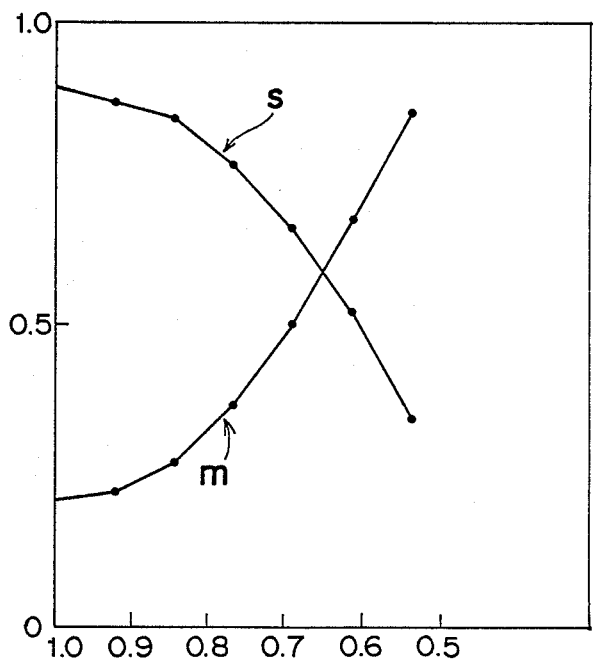

Supposing that a quantity of light for signals and a modulation degree of a glass disk each assume a value of 1, FIG. 4A is a graph having an ordinate indicative of quantity s of light for signals and modulation degree m of the polycarbonate substrate 15a and an abscissa indicative of a ratio of an area of the through-hole 21 to that of the light beam 4 in the case where the light cutting diaphragm 20 of FIG. 3A is employed. Likewise, in FIG. 4B, an abscissa indicates a ratio of an area of the through-opening 23 to that of the light beam 4 in the case where the light cutting diaphragm 20 of FIG. 3B is employed. In FIGS. 4A and 4B, the lens has a numerical aperture (NA) of 0.6, an index $n_o$ of double refraction in the direction of the X-axis is 1.585, an index of double refraction in the direction of the Y-axis is $(n_o + 5 \times 10^{-6})$, an index of double refraction in the direction of the Z-axis is $(n_o + 6 \times 10^{-4})$ and the half-mirror has a transmittance of 0.03. It is seen from FIGS. 4A and 4B that the modulation degree m is remarkably increased by cutting the portions of the light beam 4, which are elliptically polarized most. Although the quantity s of light for signals also drops, the drop assumes an absolute value on the order of mere several $\mu$W and therefore, does not lead to drop of the S/N as far as an avalanche photodiode is employed as the photodetector.

As is clear from the foregoing, in accordance with the present invention, it becomes possible to obtain reproduced signals of high quality even in the case where the plastic substrate which is likely to be subjected to double refraction is employed.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical head for recording and reproducing a signal on a recording layer formed on a substrate of an optical disk subjected to double refraction in a direction perpendicular to a plane of said substrate, said optical head comprising:
a filter having a through-hole therein with an outer peripheral portion therearound, said filter being in a path extending through said optical head along which at least a bundle of rays pass, said bundle of rays including elliptically polarized light, said outer peripheral portion being arranged to stop at least an outer portion of said bundle of rays from passing through said through-hole while a remaining portion of said bundle are permitted to pass therethrough, said outer portion of said bundle of rays including at least said elliptically polarized light such that said filter prevents said elliptically polarized light from passing therethrough.

2. The optical head as recited in claim 1 wherein said through-hole is generally circular and is formed with a diameter smaller than an outside deameter of the bundle of rays.

3. The optical head as recited in claim 1, wherein said through-hole is formed in a shape of a substantially cross-shaped through-opening defined by four arcuate portions which are diagonally opposed to each other.

* * * * *